Sept. 19, 1967  L. O. MESENHIMER  3,343,067
PHASE-CONTROLLING CIRCUITRY
Filed May 5, 1965
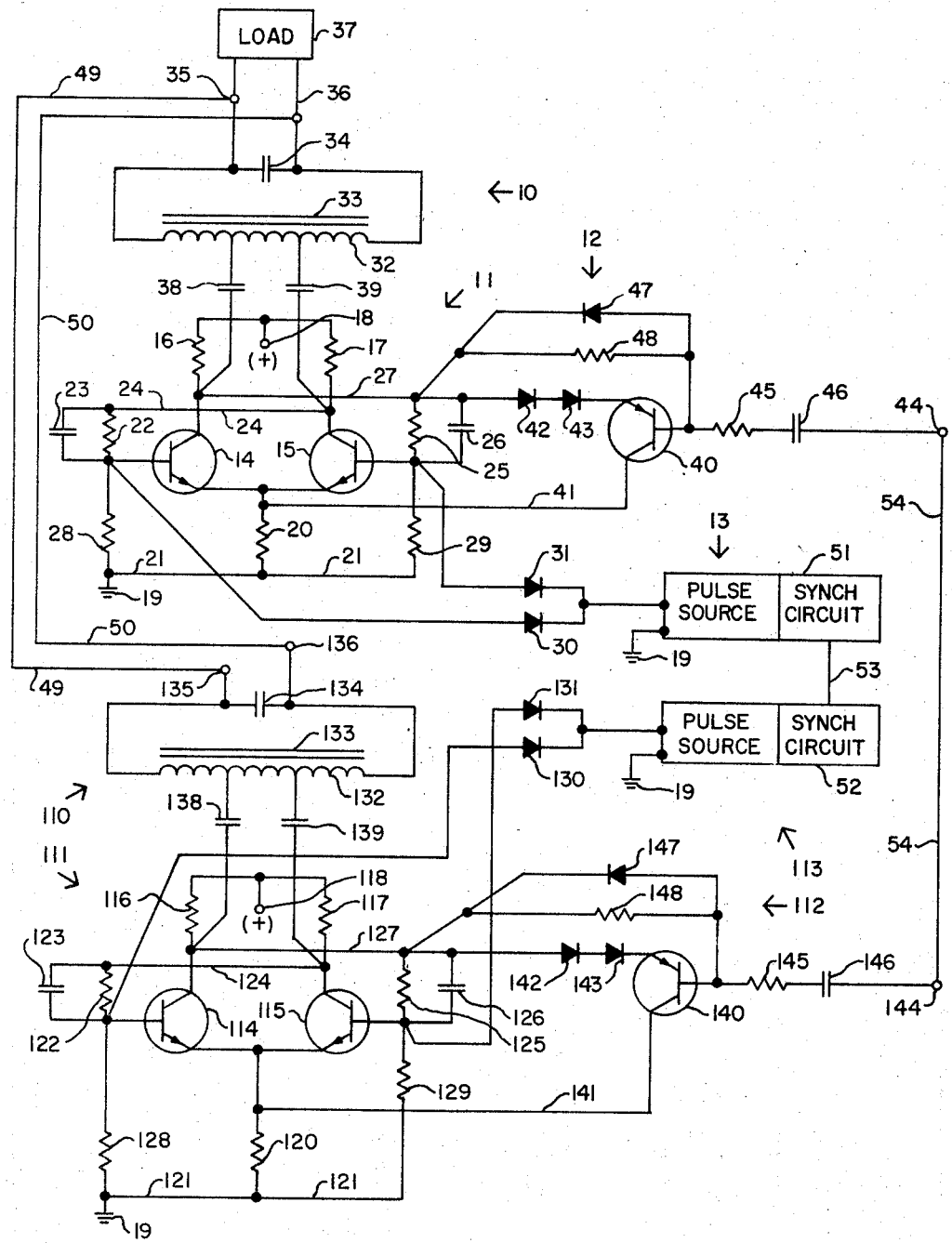
INVENTOR.
LEE O. MESENHIMER
BY *John Howard Smith*
ATT'Y United States Patent Office 3,343,067
Patented Sept. 19, 1967

3,343,067
PHASE-CONTROLLING CIRCUITRY
Lee O. Mesenhimer, Lakewood, Ohio, assignor to Lorain Products Corporation, a corporation of Ohio
Filed May 5, 1965, Ser. No. 453,401
8 Claims. (Cl. 321—27)

This invention relates to D-C to A-C converters and is directed more particularly to circuitry for maintaining an in-phase relationship between the A-C outputs of a plurality of such converters.

It is often desirable to increase the power being delivered to a load by a D-C to A-C converter. An example of this is in the telephone industry where a D-C to A-C converter may be used to supply ringing current to a telephone system. The magnitude of ringing current supplied to the telephone system may be increased by paralleling the output of a second D-C to A-C converter with the output of the first D-C to A-C converter. However, since these converters supply alternating current, the output voltages must be in-phase in order that interchange of power between the converters may be prevented.

Accordingly, it is an object of the invention to provide in a D-C to A-C converter improved circuitry, which when connected to like circuitry in another D-C to A-C converter, will establish an in-phase relationship between the output voltage of the converters.

Many D-C to A-C converters include A-C generating switching elements such as alternately conducting transistors formed in a bistable switching circuit which produces a square wave voltage. If the output voltage of the converter is required to be sinusoidal, a suitable tank circuit or filter network may be connected between the switching elements and the output terminals of the converter.

In order that the output terminals of a plurality of such D-C to A-C converters may be connected in a parallel relationship without an undesirable interchange of power between the converters, the output voltages thereof must all be in-phase. This condition will be fulfilled if corresponding switching elements in each of the converters conduct concurrently. Such simultaneous conduction of corresponding switching elements will result if they are rendered conducting together when the converters are first energized and this relationship will be maintained thereafter if timing pulses are supplied simultaneously to the bistable switching circuits of all paralleled converters.

It is another object of the invention to provide novel circuitry in a D-C to A-C converter whereby certain A-C generating switching elements in the converter are maintained in an in-phase relationship with other switching elements of like converters, all of which are to be operated in parallel.

It is also an object of the invention to provide circuitry for starting the switching circuits of D-C to A-C converters in this in-phase relationshrip, which relationship is maintained as long as synchronized timing signals are supplied to the switching circuits.

It is a further object of the invention to provide improved circuitry for a plurality of D-C to A-C converters whereby when synchronized pulse sources are supplied to the respective converters switching means in the respective converters are controlled by respective phase control elements, the latter assuring in-phase operation of respective, output paralleled converters.

It is yet another object of the invention to provide circuitry of the above character which is inactive during in-phase operation of the convertrs but which becomes active upon any tendency of the converters to lose phase thereby maintaining the in-phase relationship.

It is a further object of the invention to provide phase controlling circuits for D-C to A-C converters whereby when the first of a pair of A-C generating switching elements in one converter conducts, a corresponding A-C generating switching element in a like converter will also be rendered conducting.

Still another object of the invention is to provide a D-C to A-C converter with circuitry in which an off-on conducting device, responsive to the voltage on a phasing terminal, is paralleled with the first of a pair of A-C generating elements. The off-on conducting device is rendered "on" if a first polarity is applied to the phasing terminal thereby causing the second of the pair of A-C generating elements to turn "off."

An additional object of the invention is to provide for a bistable switching circuit utilizing first and second switching transistors, circuitry, having a phase-controlling transistor of opposite type semiconductor material from said first switching transistor and connected in parallel therewith, a unilateral conducting element connected between the base electrode and the emitter electrode of the phase-controlling transistor and a phase signal coupling network connected between the base electrode of the phase-controlling transistor and a phasing terminal whereby the bistable switching circuit will operate in phase with a like bistable switching circuit having a like phase-controlling circuit connected to the phasing terminal.

Other objects and advantages of the invention will become apparent from the following description and accompanying single schematic drawing.

Referring to the single figure, it will be seen that circuitry embodying the invention may include a tank circuit 10, a square wave generator 11, a phase-controlling circuit 12 and a pulse source 13.

The square wave generator 11 may include, by way of example, a pair of N–P–N type transistors 14 and 15 which serve as switching elements. In order to form a bistable switching circuit, the collecttor electrodes of the transistors 14 and 15 are connected through respective load resistors 16 and 17 to a D-C terminal 18 while the emitter electrode of those transistors are commonly connected to ground, as at 19, through a resistor 20 and a lead 21.

A switching action, by which the transisotr 14 is rendered conducting when the transistor 15 turns off, as will be explained presently, is effected by a resistor 22 and a parallel connected capacitor 23 connected between the base electrode of the transistor 14 and the collector electrode of the transistor 15 via a lead 24. In a similar manner, a resistor 25, paralleled by a capacitor 26, is connected between the base electrode of the transistor 15 and the collector electrode of the transistor 14 through a lead 27. The stability of the square wave generator 11 may be increased by bias resistors 28 and 29 which are respectively connected between the base electrode of transitsor 14 and the grounded lead 21 and between the base electrode of the transistor 15 and the ground lead 21. These resistors serve to provide a slight reverse bias on the respective transistors to which they are connected so that whichever transistor is in a nonconducting state will remain so until supplied with a suitable signal as will be described presently.

The square wave generator 11, as indicated previously, is a bistable circuit in that whichever of the transistors 14 and 15 conducts first after D-C energy is applied between the terminal 18 and the ground 19 will remain conducting until turned off by an external timing signal. Consequently, when the transistor 14 turns off in response to a timing pulse, the transistor 15 is rendered conducting. This condition persists until the transistor 15 is turned off by a timing signal, whereupon the transistor 14 is again rendered conducting.

The external signal may be in the form of negative timing pulses provided by the pulse source 13. In order to supply these timing pulses to the transistors 14 and 15, the respective base electrodes thereof are connected to the pulse source 13 by means of a diode 30 and a diode 31, respectively.

If it is desired to convert the square wave output voltage of the square wave generator 11 into a sinusoidal voltage, the tuned tank circuit 10 may be provided. This tank circuit may include a winding 32 having a pair of symmetrical disposed taps and carried on a core 33 with a tuning capacitor 34 bridging the winding 32. A pair of output terminals 35 and 36, across which there is connected a load 37, are connected to opposite sides of the capacitor 34. The values of the inductor 32 and the capacitor 34 are selected to produce in the tank circuit 10 a resonant frequency equal to the switching frequency of the transistors 14 and 15.

The tank circuit 10 is energized by connecting one of the taps of the winding 32 to the collect or electrode of the transistor 14 through a capacitor 38 and by connecting the other tap of the winding 32 to the collector electrode of the transistor 15 through a capacitor 39. Thus, the square wave voltage developed between the collector electrodes of the transistors 14 and 15 is applied to the tank circuit 10, thereby causing the tank circuit to develop a sine wave.

In the event that the load 37 requires more current than can be safely supplied by the first converter described above, the output of a second similar converter may be paralleled with the output of the first converter. The second similar converter may include output terminals 135 and 136 connected to the load 37 via leads 49 and 50 as shown.

As explained previously, the paralleled alternating output voltages of these converters must be in phase in order to prevent cancellation of the total voltage being applied to the load and to preclude a condition in which the parallel converters would be supplying current to one another, as for example if the output voltages were 180° out of phase. To this end the phase-controlling circuit 12 is provided.

This circuit may include, by way of example, a P–N–P type phase-controlling transistor 40 having its collector electrode connected to the upper end of the resistor 20 by means of a lead 41 and its emitter electrode connected to the collector electrode of the transistor 14 through suitable diodes 42 and 43 and the lead 27. The diodes 42 and 43 and resistor 48 serve as bias means to prevent conduction of the transistor 40 in the absence of emitter-base, phasing current in phasing lead 54. From the foregoing connections, it will be seen that the transistor 40 is in parallel with the transistor 14. Consequently, in accordance with the normal operation of bistable multivibrators, conduction of the transistor 40 will have the same effect upon the transistor 15 as conduction of the transistor 14. Thus, if transistor 40 conducts, transistor 15 will turn off.

In order to suitably control the conduction of the transistor 40, the base electrode thereof is connected to a phasing terminal 44 through a phase signal coupling resistor 45 and a phase coupling capacitor 46. A suitable diode 47 may be connected between the base electrode of the transistor 40 and the lead 27 to provide a bypass path for current to flow between the phasing terminal 44 and the transistor 14 around the emitter-base current path of the transistor 40. A resistor 48 connected in parallel with the diode 47 provides a path for base-collector leakage current in the transistor 40 to stabilize the operation of that transistor.

As indicated previously, it may be desired to operate the D-C to A-C converter described herein parallel with a similar converter. Such a converter is shown in the lower portion in the single figure and parts similar to those of the first converter have like numerals but are prefixed by the numeral "1".

The outputs of the converters may be paralleled by connecting the output terminals 35 and 36 of the first converter to the output terminals 135 and 136 of the second or parallel converter through leads 49 and 50, respectively. To insure that the transistors 14 and 15 will switch concurrently with the transistors 114 and 115, a synchronizing circuit 51 in the pulse source 13 is connected to a synchronizing circuit 52 in the pulse source 113 by means of a lead 53. An in-phase relationship between the alternating output voltages of the converters will be established under starting conditions and will be maintained during operation by connecting the phasing terminal 44 to the phasing terminal 144 via a lead 54.

The operation of the foregoing circuitry will now be described. When the negative pole of a D-C source is connected to the ground 19 and the positive pole is connected to the D-C terminals 18 and 118, one or the other of the transistors 14 and 15 will begin to conduct and one or the other of the transistors 114 and 115 will begin to conduct. Assuming that the transistor 14 begins to conduct before the transistor 15, the voltage at the collector electrode of the transistor 14 will become less positive with respect to ground as the conduction of this transistor increases. In the case of the transistors 114 and 115, assuming that the transistor 115 conducts first, the decreasing positive voltage on the collector electrode thereof is in effect a negative going signal which will be applied to the base electrode of the transistor 114 through the capacitor 123, causing the transistor 114 to be held in a nonconducting condition. As a result, the voltage appearing at the collector electrode of the transistor 114 with respect to ground is approximately equal to the positive potential applied at the terminal 118.

Since, under these conditions, the collector electrode of the transistor 114 is positive with respect to the collector electrode of the transistor 14, current will flow from the positive terminal 118 through the resistor 116, the lead 127, the diodes 142 and 143, the emitter-base path of the transistor 140, the resistor 145, the capacitor 146, the phasing terminal 144 and the phasing lead 54 to the phasing terminal 44. From terminal 44 the current flows through the capacitor 46, the resistor 45, the diode 47, the lead 27, the collector-emitter path of the transistor 14, and the resistor 20 to ground 19. This current flow through the emitter-base current path of the transistor 140 renders that transistor conducting and permits current to flow from the D-C terminal 118 through the resistor 116, the lead 127, the diodes 142 and 143, the emitter-collector path of the transistor 140, the lead 141 and the resistor 120 to ground 19. The direction of current flow through the diode 47 is in the opposite sense to the direction of normal emitter-base current of the transistor 40.

The conduction of the transistor 140 causes the potential at the lower end of the load resistor 116 to become less positive with respect to ground producing a negative going wavefront which is applied to the base electrode of the transistor 115 to turn it off. When the transistor 115 ceases conducting, its collector electrode becomes more positive with respect to ground. This positive going voltage is applied to the base of the transistor 114 through the resistor 122 and through the capacitor 123 causing the transistor 114 to be rendered conducting. Thus, by means of the phase-controlling transistor 140, transistor 114 has been rendered conducting concurrently with the transistor 14 to produce an in-phase relationship between the switching transistors of the converters. With the transistors 14 and 114 both conducting the voltages on their respective collector electrodes are now substantially equal to one another and no current traverses the lead 54. Similarly, when those transistors are nonconducting, no current flows in the lead 54 since the collector electrode voltages are equal.

The transistors 14 and 114 will continue to conduct until turned off by a negative timing pulse applied to each of them from the respective pulse sources 13 and 113. Due to the connection of the synchronizing circuit 51 of the pulse source 13 to the synchronizing circuit 52 of the pulse source 113 by means of the lead 53, a timing pulse is applied to the base of the transistor 14 simultaneously with the timing pulse applied to the base electrode of the transistor 114. These timing pulses cause the transistors 14 and 114 to turn off thereby rendering the transistors 15 and 115 conducting due to the positive going voltages supplied to the respective base electrodes from the collector electrodes of transistors 14 and 15, respectively. The switching action between the transistors 14 and 15 and between the transistors 114 and 115 is now controlled by the synchronized timing pulses from the respective pulse sources 13 and 113. Thus, since the conduction of the transistor 14 causes the transistor 114 to turn on when the circuits were energized, the square wave generator 11 and the square wave generator 111 will remain in phase due to the synchronized switching activity resulting from the synchronized timing pulses.

It will be seen that had the transistor 114 started to conduct before the transistor 14, the current flow would have been from the collector electrode of the transistor 14 through the emitter-base path of the transistor 40 and the diode 147 to the collector electrode of the transistor 114 and then to ground through the resistor 120. In this case, the transistor 40 would have been rendered conducting causing the transistor 15 to turn off thereby rendering the transistor 14 conducting. Thus, the transistors 14 and 114 would then be operating in phase as desired. The current flow through the diode 147 is in the opposite sense to the emitter-base current produced in the transistor 140 when the transistor 14 conducts before the transistor 114 as described previously.

In the event that the transistors 14 and 114 both begin conducting at the same time when the circuits are first energized, the decreasing positive potential on the collector electrode of the transistor 14 will be approximately the same as the decreasing positive potential on the collector electrode on the transistor 114. Therefore, no current will flow between the phase-controlling circuits 12 and 113 and the transistor pairs 14, 15 and 114, 115 will maintain the correct phase relationship with which they initially began operation. Alternatively, if the transistors 15 and 115 both begin conducting together upon initial energization, the collector electrodes of the transistors 14 and 114 will be at approximately the same positive potential with respect to ground. Accordingly, no current will flow between the phase-controlling circuits 12 and 112 and the in-phase relationship between the transistor switching pairs will be continued during their switching activity.

Should the converters for some reason tend to lose phase during operation, the phase controlling circuits 12 and 112 will operate in the same manner as under starting conditions. Accordingly, if one of the transistors 14 or 114 fails to conduct in response to the synchronized pulses from the respective pulse sources 13 and 113, the corresponding transistor 40 or 140 will conduct to produce an in-phase condition as described previously.

It will be understood that transistors of the opposite type to those described in the foregoing circuitry may be used if the polarities are reversed.

From the foregoing, it will be seen that the invention provides phase controlling circuitry for starting the switching circuits of D-C to A-C converters in a predetermined phase relationship, this phase relationship being maintained as long as the switching circuits are provided with synchronized timing signals. This phase controlling circuitry also maintains the in-phase relationship during normal operation.

It will be understood that the embodiment shown herein is for explanatory purposes and may be changed or modified without departing from the spirit and scope of the invention as set forth in the claim appended hereto.

What I claim is:

1. In a D-C to A-C converter adapted to be operated in phase with one or more like converters and each of which includes a source of timing pulses and a phasing terminal adapted to be connected to a like phasing terminal of a like converter, the timing pulses of all sources being synchronized, in combination, a bistable voltage source including first and second switching means, means for supplying timing pulses to said first and second switching means, variable conducting means having first and second power electrodes and a control electrode, means for connecting said power electrodes of said variable conducting means across said first switching means, means for connecting said control electrode of said variable conducting means to the phasing terminal, unidirectional conducting means, means for connecting said unidirectional conducting means between said control electrode and said first power electrode of said variable conducting means.

2. In a D-C to A-C converter having a phasing terminal adapted to be connected to a like phasing terminal of a like paralleled D-C to A-C converter, the combination of a square wave voltage source including first and second switching transistors of like type semiconducting material, a phase-controlling transistor having emitter, base and collector electrodes of opposite type semiconduccting material to said first and second transistors, means for connecting the emitter-collector current path of said phase-controlling transistor in parallel with said first switching transistor and poled to pass current in the same direction as said first switching transistor, a resistor and a capacitor serially connected between said base electrode of said phase-controlling transistor and the phasing terminal, a diode, means for connecting said diode between said base electrode and said emitter electrode of said phase-controlling transistor and poled to pass current in the opposite sense to the direction of normal current flow through the emitter-base path of said phase controlling transistor.

3. In a D-C to A-C converter, in combination, first and second transistors each having emitter, base and collector electrodes, a pair of power input terminals adapted to be connected to a poled D-C source, first and second load resistors connected between one of said power terminals and the collector electrodes of said first and second transistors, respectively, a bias resistor, means for commonly connecting the emitter electrodes of said first and second transistors to the other of said power terminals through said bias resistor, a first switching control resistor connected between said collector electrode of said first transistor and said base electrode of said second transistor, a first switching control capacitor connected in parallel with said first switching control resistor, a second switching control resistor connected between said collector electrode of said second transistor and said base electrode of said first transistor, a second switching control capacitor connected in parallel with said second switching control resistor, a tank circuit including a tuning inductor having a tuning capacitor connected thereacross, said tank circuit being provided with output terminals adapted to be connected to a load, means for connecting the collector electrode of said first transistor to said tank circuit, means for connecting the collector electrode of said second transistor to said tank circuit, a timing pulse source, means for simultaneously supplying timing pulses from said timing pulse source to said first and second transistors whereby said transistors interchange conducting states in response to each of said timing pulses, a phase controlling transistor of opposite polarity type from said first and second transistors and having emitter, base and collector electrodes, means for connecting said collector electrode of said phase controlling transistor to said emitter electrode of said first transistor, means for connecting said emitter electrode of said phase controlling transistor to said collector electrode of said first transistor, a phasing terminal, a phase signal coupling resistor, a phase signal coupling capacitor, means for serially connecting said phase signal coupling resistor and said phase signal coupling capacitor between said base electrode of said phase-controlling transistor and said phasing terminal, a diode, means for connecting said diode between said base electrode and said emitter electrode of said phase controlling transistor and poled to pass current in the opposite sense to the direction of normal current flow through the emitter-base path of said phase controlling transistor.

4. In a D-C to A-C converter, in combination, first and second transistors each having emitter, base and collector electrodes, a pair of power input terminals adapted to be connected to a poled D-C source, first and second load resistors connected between one of said power terminals and the collector electrodes of said first and second transistors, respectively, a bias resistor, means for commonly connecting the emitter electrodes of said first and second transistors to the other of said power terminals through said bias resistor, a first switching control resistor connected between said collector electrode of said first transistor and said base electrode of said second transistor, a first switching control capacitor connected in parallel with said first switching control resistor, a second switching control resistor connected between said collector electrode of said second transistor and said base electrode of said first transistor, a second switching control capacitor connected in parallel with said second switching control resistor, a tank circuit including a tuning inductor having a tuning capacitor connected thereacross, said tank circuit being provided with output terminals adapted to be connected to a load, means for connecting the collector electrode of said first transistor to said tank circuit, means for connecting the collector electrode of said second transistor to said tank circuit, a timing pulse source, means for simultaneously supplying timing pulses from said timing pulse source to said first and second transistors whereby said transistors interchange conducting states in response to each of said timing pulses, variable conducting means having first and second power electrodes and a control electrode, means for connecting said power electrodes of said variable conducting means between said emitter and said collector electrodes of said first transistor, a phasing terminal, means for connecting said control electrode of said variable conducting means to said phasing terminal, unidirectional conducting means, means for connecting said unidirectional conducting means between said control electrode and said first power electrode of said variable conducting means.

5. In a D-C to A-C converter adapted to be operated in phase with one or more like converters and each of which includes a source of timing pulses, each successive timing pulse of each source occurring simultaneously with the timing pulses of the other sources, in combination, a bistable voltage source including first and second coacting switching elements, means for connecting said first and second coacting switching elements in signal receiving relationship to a source of timing pulses, phase-controlling means, a phasing terminal connected to said phase-controlling means, means for connecting said phase- controlling means to said first switching element whereby said first switching element is rendered conducting when the current flowing between said phasing terminal and the phasing terminal of a like converter connected thereto is of a first sense, current bypass means connected between said phasing terminal and said first switching element whereby current flows between said first switching element and said phasing terminal through said current bypass means when current flowing between said phasing terminal and the phasing terminal of the like converter is of a second sense.

6. In a D-C to A-C converter adapted to be operated in phase with one or more like converters and each of which includes a source of timing pulses and a phasing terminal adapted to be connected to a like terminal of a like converter, the timing pulses of the sources being synchronized, in combination, an A-C generator including first and second alternately conducting, coacting switching elements, means for connecting said first and second switching elements in signal receiving relationship to a source of timing pulses, variable conducting means having first and second power electrodes and a control electrode, means for connecting said power electrodes of said variable conducting means across said first switching element, means for connecting said control electrode of said variable conducting means to the phasing terminal, unidirectional conducting means, means for connecting said unidirectional conducting means between said control electrode and said first power electrode of said variable conducting means.

7. In a D-C to A-C converter adapted to be operated in phase with one or more like converters and each of which includes a source of timing pulses and a phasing terminal adapted to be connected to a like terminal of a like converter, the timing pulses of the sources being synchronized, in combination, an A-C generator including first and second alternately conducting coacting switching elements, means for connecting said first and second switching elements in signal receiving relationship to a source of timing pulses, a phase controlling transistor having an emitter, a base and a collector electrode, bias means for said transistor, means for connecting the emitter-collector current path of said transistor in parallel with the current path of said first switching element, said connecting means including said bias means, unidirectional conducting means connected between said first switching element and said base electrode of said transistor and poled to pass current around the emitter-base current path of said transistor, a phase signal coupling resistor, a phase signal coupling capacitor, means for serially connecting said coupling resistor and said coupling capacitor between said base electrode of said transistor and the phasing terminal.

8. In a D-C to A-C converter energized from a D-C source and adapted to be operated in phase with one or more like converters each of which includes a source of timing pulses and a phasing terminal adapted to be connected to a like terminal of a like converter, the timing pulses of the sources being synchronized, in combination, an A-C generator including first and second switching transistors each having emitter, base and a collector electrodes, means for connecting said first and second switching transistors in signal receiving relationship to a source of timing pulses, first and second load resistors connected between one side of the D-C source and respective collector electrodes of said first and second transistors, resistive means connected between the respective emitter electrodes of said first and second transistors and the other side of the D-C source, a first resistive-capacitive network connected between said collector electrode of said first transistor and said base electrode of said second transistor, a second resistive-capacitive network connected between said collector electrode of said second transistor and said base electrode of said first transistor, output means connected to the collector electrodes of said first and second transistors, variable conducting means having power electrodes and a control electrode, means for connecting said power electrodes of said variable conducting means between said emitter electrode and said collector electrode of said first transistor, means for connecting said control electrode of said variable conducting means to the phasing terminal, unidirectional conducting means connected between said control electrode of said variable conducting means and said collector electrode of said first transistor to pass current in the opposite sense to the direction of normal current flow through the emitter-base path of said phase controlling transistor.

References Cited

UNITED STATES PATENTS

| 2,855,561 | 10/1958 | Steinitz | 321—27 |
| 3,002,142 | 9/1961 | Jensen | 331—56 X |
| 3,205,424 | 9/1965 | Bates | 321—18 |
| 3,283,238 | 11/1966 | Huge et al. | 323—9 |
| 3,297,955 | 1/1967 | Corey et al. | 331—55 |

JOHN F. COUCH, *Primary Examiner.*

G. GOLDBERG, *Assistant Examiner.*